United States Patent

Washizu

[11] Patent Number: 5,127,682
[45] Date of Patent: Jul. 7, 1992

[54] JOINT

[75] Inventor: Katsushi Washizu, Numazu, Japan

[73] Assignee: Usui Kokusai Sangyo Kaisha, Ltd., Japan

[21] Appl. No.: 705,729

[22] Filed: May 24, 1991

[30] Foreign Application Priority Data

May 30, 1990 [JP] Japan .................... 2-140458

[51] Int. Cl.⁵ .............................. F16L 35/04
[52] U.S. Cl. ............................. 285/319; 285/351; 285/379; 285/921
[58] Field of Search ............ 285/319, 921, 351, 348, 285/108, 379; 277/188 R, 188 A, 189, 47, 51, 195, 198

[56] References Cited

U.S. PATENT DOCUMENTS

| | | |
|---|---|---|
| 2,892,991 | 6/1959 | Beebee et al. |
| 3,169,030 | 2/1965 | Lippincott |
| 3,453,005 | 7/1969 | Foults |
| 3,826,523 | 7/1974 | Eschbaugh |
| 3,933,378 | 1/1976 | Sandford et al. |
| 4,026,581 | 5/1977 | Pasbrig |
| 4,035,005 | 7/1977 | DeVincent et al. |
| 4,074,912 | 2/1978 | Van Bilderbeek et al. |
| 4,219,222 | 8/1980 | Brusadin |
| 4,275,907 | 6/1981 | Hunt |
| 4,422,673 | 9/1985 | Richardson .................... 285/108 |
| 4,451,069 | 5/1984 | Melone |
| 4,540,201 | 12/1983 | Blackford et al. ............. 285/379 |
| 4,601,497 | 7/1986 | Batholomew |
| 4,637,636 | 1/1987 | Guest |
| 4,637,640 | 1/1987 | Fournier et al. |
| 4,673,199 | 6/1987 | Renfrew |
| 4,681,351 | 7/1987 | Bartholomew |
| 4,730,856 | 3/1988 | Washizu |
| 4,749,214 | 6/1988 | Hoskins et al. |
| 4,753,458 | 6/1988 | Case et al. |
| 4,776,616 | 10/1988 | Umehara et al. |
| 4,778,203 | 10/1988 | Bartholomew |
| 4,781,400 | 11/1988 | Cunningham |
| 4,793,637 | 12/1988 | Laipply et al. |
| 4,890,941 | 1/1990 | Calfell, II et al. ............ 277/195 |
| 4,895,396 | 1/1990 | Washizu |
| 4,913,467 | 4/1990 | Washizu |
| 4,915,420 | 4/1990 | Washizu |
| 4,944,537 | 7/1990 | Usui et al. |
| 4,946,205 | 8/1990 | Washizu |
| 4,948,180 | 8/1990 | Usui et al. |
| 4,964,658 | 10/1990 | Usui et al. |
| 4,997,216 | 3/1991 | Washizu |
| 5,002,315 | 3/1991 | Bartholemew ................ 285/921 |

FOREIGN PATENT DOCUMENTS

| | | |
|---|---|---|
| 370427 | 2/1907 | France ........................... 285/348 |
| 593413 | 5/1959 | Italy |
| 855603 | 12/1960 | United Kingdom |

Primary Examiner—Randolph A. Reese
Assistant Examiner—Timothy Aberle
Attorney, Agent, or Firm—Anthony J. Casella; Gerald E. Hespos

[57] ABSTRACT

A joint comprises a body including a cylindrical front wall having an inner bore, a small diameter chamber extending from the bore and having a diameter larger than that of the cylindrical wall, a large diameter chamber extending rearwardly from the small diameter chamber, and a rear, engagement wall, seal rings disposed in the small diameter chamber through a spacer, and a discrete socket having a rear end engaged with the engagement wall of the body and a front end projecting to provide a plurality of claws. The claws are resiliently engageable with an annular projection of a pipe when the pipe is inserted into the joint. The small diameter chamber has an annular step on its inner periphery. The spacer includes an annular projection for engagement with the step of the small diameter chamber. A bushing is disposed behind the seal rings.

6 Claims, 2 Drawing Sheets

JOINT

BACKGROUND OF THE INVENTION

1. Field of the Invention

The present invention relates to an improvement in the structure of a connector or joint for use with metal pipes or resin tubes (hereinafter simply referred to as a pipe) assembled in a vehicle or other machines or apparatus to feed oil or air and having a relatively small diameter, typically, of less than 20 m/m.

2. Description of the Related Art

A conventional joint is exemplified, for example, in FIG. 7 and includes a body 21 enlarged as at 22 to form a small diameter chamber. The small diameter chamber 22 has a smooth inner peripheral surface 22'. An annular space 25 also has a smooth outer peripheral surface, and a pair of seal rings 23 and 23' are disposed in the small diameter chamber 22 at opposite sides of the spacer 25. 24 is a bushing. 26 is a socket including an integral resilient claw 26'. Po is a pipe.

In the prior art, however, if the pipe Po is obliquely inserted into the small diameter chamber 22, the leading end of the pipe Po causes the spacer 25 to axially move forwards. As a result, the seal ring 23' disposed in the bottom of the small diameter chamber 22 are excessively collapsed or deformed to prevent subsequent insertion of the pipe Po. Such excessive deformation of the seal ring 23' may results in separation of the seal ring 23 from the bottom of the small diameter chamber before the pipe Po is completely assembled to the joint.

SUMMARY OF THE INVENTION

In view of the problems encountered in the prior art, it is an object of the present invention to provide a joint which completely prevents forward movement of the spacer when a pipe is inserted in an oblique fashion and thus, excessive deformation of the seal ring disposed in the bottom so as to allow smooth insertion of the pipe and eliminate separation of the seal ring from the bottom.

In order to achieve these objects, there is provided a joint comprising a body including a cylindrical front wall defining an inner bore, a small diameter chamber extending from the bore and having a diameter larger that that of the bore, a large diameter chamber extending rearwardly from the small diameter chamber, and a rear, engagement wall, seal rings disposed in the small diameter chamber through a spacer, and a discrete socket having a rear end engaged with the engagement wall of the body and a front end projecting to provide a plurality of claws resiliently engageable with an annular projection formed near one end of a pipe when the pipe is inserted into the large diameter chamber to press the seal rings, wherein the small diameter chamber has an annular step on its inner periphery, and the spacer, which is adapted to press the seal ring located in the bottom of the small diameter chamber, includes an annular projection for engagement with the step of the small diameter chamber.

There is also provided a joint comprising a body including a cylindrical front wall having an inner bore, a small diameter chamber extending from the bore and having a diameter chamber extending rearwardly from the small diameter chamber, and a rear, engagement wall, seal rings disposed in the small diameter chamber through a spacer, and a discrete socket having a rear end engaged with the engagement wall of the body and a front end projecting to provide a plurality of claws resiliently engageable with an annular projection formed near one end of a pipe when the pipe is inserted into the large diameter chamber to press the seal rings, wherein the spacer is so located as to press the seal ring in the bottom of the small diameter chamber and has a stopper wall extending from the front end of the spacer and terminating at the bottom of the small diameter chamber to surround the seal ring. A bushing is disposed behind the seal rings.

Also, in order to achieve the foregoing objects, there is provided a joint comprising a body including a cylindrical front wall having an inner bore, a small diameter chamber extending from the bore and having a diameter larger than that of the cylindrical wall, a large diameter chamber extending rearwardly from the small diameter chamber, and a rear, engagement wall, seal rings disposed in the small diameter chamber through a spacer and a bushing, and a discrete socket having a rear end engaged with the engagement wall of the body and a front end projecting to provide a plurality of claws resiliently engageable with an annular projection formed on near one end of a pipe when the pipe is inserted into the large diameter chamber to press the seal rings, wherein the spacer and the bushings are integrally formed together and has an annular recess to receive one of the seal rings, and wherein the bushing is engaged with the step of the large diameter chamber. The spacer has a stopper wall extending from the front end of the spacer and terminating at the bottom of the small diameter chamber to surround the other seal ring in the bottom of the small diameter chamber.

The present invention provides engagement of the step of the small diameter chamber with the projection of the spacer, contact of the stopper wall with the bottom of the small diameter chamber, or engagement of the bushing, integral with the spacer, with the step of the large diameter chamber. This arrangement prevents forward movement of the spacer and thus, excessive deformation of the seal ring in the bottom of the small diameter chamber if a pipe is inserted in an oblique manner. The pipe can thus be smoothly inserted further into the joint. Advantageously, the seal ring are not longer separated from the bottom of the small diameter chamber.

BRIEF DESCRIPTION OF THE DRAWINGS

For a better understanding of the present invention, reference may be made to the following description of preferred embodiments when taken in conjunction with the accompanying drawings, in which.

DESCRIPTION OF THE PREFERRED EMBODIMENTS

Figure 1:
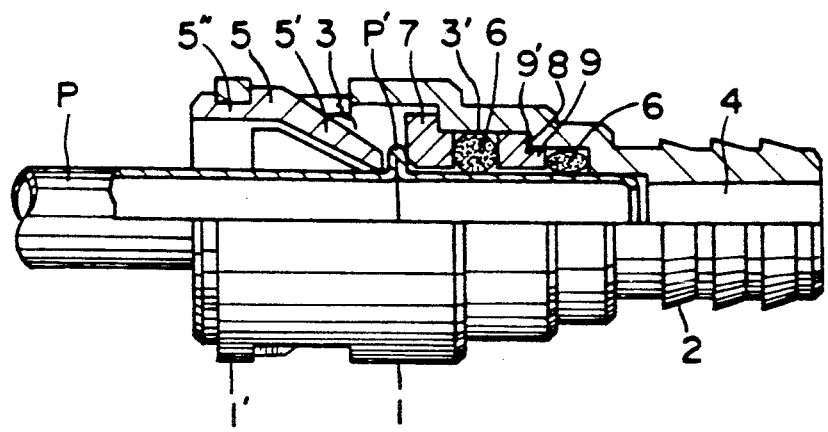
FIG. 1 is a vertical sectional view, partly broken away, of a joint according to one embodiment of the present invention, with a pipe being inserted into the joint.

Referring to FIGS. 1 to 6, 1 is a joint body made of metal or resin and having a cylindrical wall 2 through which a bore 4 extends. The body 1 includes a small diameter chamber 3' having a diameter larger than that of the bore 4 and including an annular step 8, and a large diameter chamber 3 extending rearwardly from the small diameter chamber 3' and including an annular step. The body 1 has a rear, engagement wall 1' at its rear end. Two seal rings 6 and 6' are made of rubber or other resilient materials and disposed in the small diameter chamber 3' through a spacer 9. A bushing 7 is also inserted behind the seal ring 6 to engage the step of the large diameter chamber 3.

Figure 2:
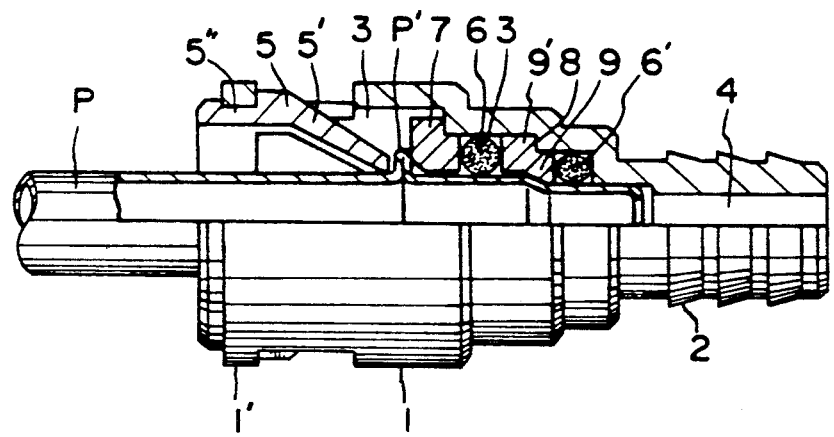
FIGS. 2 and 3 are views similar to FIG. 1, but showing different embodiments of the invention.
Figure 3:
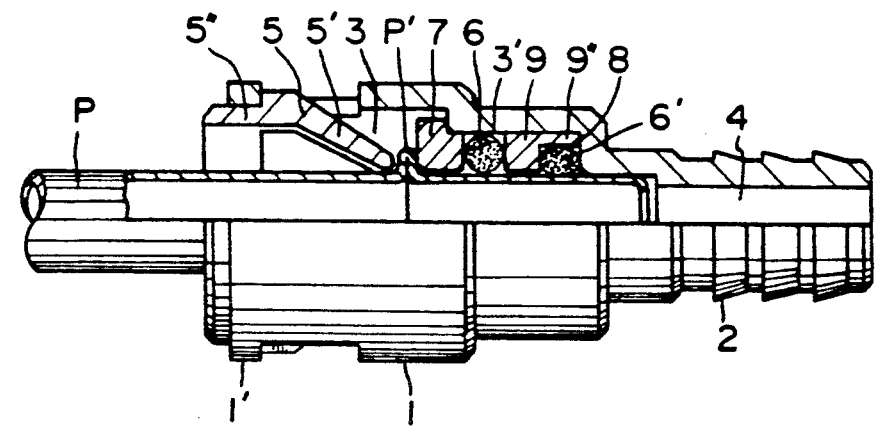

The spacer 9 radially extends to provide an annular projection 9' for engagement with the step 8 of the small diameter chamber 3' see FIGS. 1 and 2). Alternatively, the spacer 9 may include a stopper wall ('' terminating at one end or bottom of the small diameter chamber to surround the seal ring 6' (see FIG. 3). 5 is a socket made of metal or resin. A plurality of claws 5' extend from the front end of the socket 5 into the large diameter chamber 3. The socket 5 has an annular wall 5'''' at its rear end. The annular wall 5'''' has a recess to engage with the engagement wall 1' of the joint body 1. A pipe P is enlarged to provide an annular projection P' for resilient engagement with the front end of each of the claws 5' when the pipe P is fit in the joint body 1.

Figure 4:
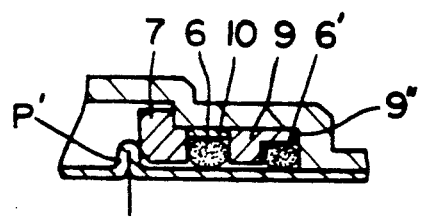
FIGS. 4 to 6 are enlarged sectional views showing the principal part of other embodiments of the invention.

FIG. 4 shows another embodiment of the invention. A separator 10 is in the form of a ring and disposed between the bushing 7 and the spacer 9 to surround the seal ring 6.

Figure 5:
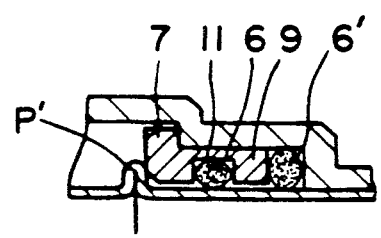
Figure 6:
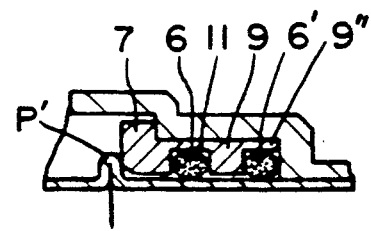
Figure 7:
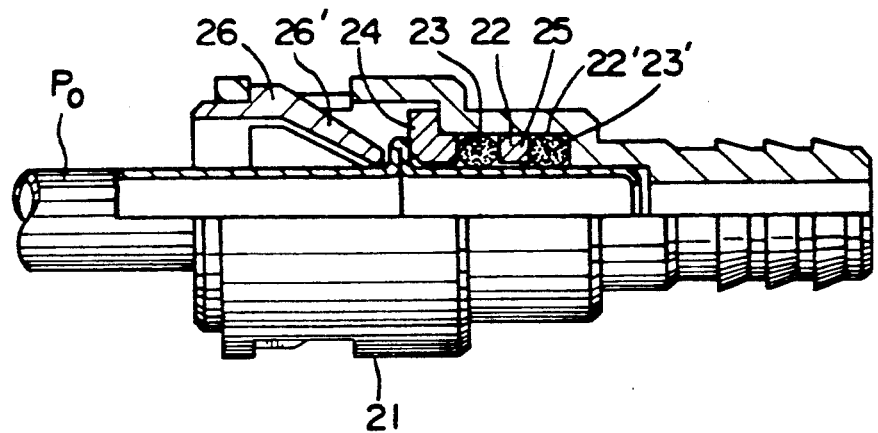
FIG. 7 is a vertical sectional view of a conventional joint with a pipe inserted into the joint.

FIGS. 5 and 6 show further embodiments of the invention. Specifically, the bushing 7 and the spacer 9 are integrally formed together. An annular recess 11 is formed between the bushing 7 and the spacer 9 to receive the seal ring 6. The bushing 7 is engaged with the step of the large diameter chamber 3 so as to prevent forward movement of the spacer 9 and thus, deformation of the seal ring 6' in the bottom of the small diameter chamber. As shown in FIG. 6, a stopper wall 9' ∝ may extend from the front end of the spacer 9 to the bottom of the small diameter chamber so as to surround the seal ring 6'.

With the joint of the present invention thus far described, engagement of the step 8 of the small diameter chamber 3' with the projection 9' of the spacer 9, contact of the stopper wall 9'' of the spacer 9 with the bottom of the small diameter chamber, or engagement of the bushing 7, integral with the spacer 9, with the step of the large diameter chamber 3 prevents forward movement of the spacer 9 and thus, excessive deformation of the seal ring 6' in the bottom of the small diameter chamber if the pipe P is inserted in an oblique manner. The pipe P can thus be smoothly inserted further into the joint. At the same time, the seal ring 6' are no longer separated from the bottom of the seal ring 6' before the pipe P is completely assembled to the joint. The joint of the present invention is thus very useful.

I claim:

1. A joint for a pipe having an end and an annular projection formed near the end, the joint comprising: a body including opposed front and rear ends, and inner bore extending into the front end, a small diameter chamber extending rearwardly from the bore and having a diameter larger than that of the bore such that a bottom wall is defined in the small diameter chamber adjacent the bore, a large diameter chamber extending rearwardly from the small diameter chamber, and a rear engagement wall adjacent the rear end of the body, at least one seal ring being held in abutting contact with the bottom wall in the small diameter chamber by a spacer, and a discrete socket having a rear end engaged with the engagement wall of the body and a front end projecting to provide a plurality of claws, said claws being resiliently engageable with the annular projection formed near the end of the pipe when the pipe is inserted into the large diameter chamber, such that the claws and the annular projection hold the seal ring and the spacer in the small diameter chamber, wherein said small diameter chamber has an annular step on its inner periphery, and said spacer includes an annular projection engaged with the step of said small diameter chamber, the engagement of the annular projection of the spacer with the step of the small diameter chamber maintaining said spacer in abutting contact with the seal ring and in selected spaced relationship to the bottom wall of the small diameter chamber, whereby the spacer holds the seal ring in the small diameter chamber for sealing engagement with the pipe and wherein the engagement of the annular projection of the spacer with the annular step of the small diameter chamber prevents axial movement of the spacer during insertion of the pipe into the joint.

2. A joint according to claim 1, wherein said at least one seal ring comprises a second seal ring, disposed adjacent the spacer and rearwardly thereof in the small diameter chamber of the joint body, and wherein the joint further comprises a bushing disposed rearwardly of and adjacent to the second of the seal ring, the bushing being configured to engage the joint body to prevent axially forward movement of the bushing in the joint body during insertion of the pipe.

3. A joint for a pipe having an end and an annular projection formed near the end, the joint comprising: a body including opposed front and rear ends, an inner bore extending into the front end, a small diameter chamber extending rearwardly from the bore and having a diameter larger than that of the bore, such that a bottom wall is defined in the small diameter chamber adjacent the bore, a large diameter chamber extending rearwardly from the small diameter chamber, and a rear engagement wall adjacent the rear end of the body, at least one seal ring being held adjacent the bottom wall in the small diameter chamber by a spacer, and a discrete socket having a rear end engaged with the engagement wall of the body and a front end projecting to provide a plurality of claws, said claws being resiliently engageable with the annular projection formed near the end of the pipe when the pipe is inserted into the large diameter chamber, such that the claws and the annular projection hold the seal ring and the spacer in the small diameter chamber, wherein said spacer is so located as to press the seal ring against the bottom wall of the small diameter chamber, said spacer having a stopper wall disposed radially outwardly from the seal ring and terminating at the bottom wall of the small diameter chamber, such that the spacer and the bottom wall of the small diameter chamber surround said seal ring, the portion of the spacer disposed radially outwardly of the seal ring and terminating at the bottom wall of the small diameter chamber preventing the spacer from moving axially forwardly in the small diameter chamber during insertion of the pipe into the joint.

4. A joint according to claim 3, wherein said at least one seal ring comprises a second seal ring disposed adjacent the spacer and rearwardly thereof in the small diameter chamber of the joint body, and wherein the joint further comprises a bushing disposed rearwardly of and adjacent to the second the seal ring, the bushing being configured to engage the joint body to prevent axially forward movement of the bushing in the joint body during insertion of the pipe.

5. A joint for a pipe having an end and an annular projection formed near the end, the joint comprising: a body including opposed front and rear ends, an inner bore extending into the front end, a small diameter chamber extending rearwardly from the bore and having a diameter larger than that of the bore, such that a bottom wall is defined in the small diameter chamber adjacent the bore, a large diameter chamber extending rearwardly from the small diameter chamber such that a step is defined in the large diameter chamber adjacent the small diameter chamber, and a rear engagement wall, seal rings being positioned in the small diameter chamber by a spacer and a bushing, and a discrete socket having a rear end engaged with the engagement wall of the body and a front end projecting to provide a plurality of claws, and claws being resiliently engageable with the annular projection formed near the end of the pipe when the pipe is inserted into the large diameter chamber, such that the claws and the annular projection hold the spacer and the bushing in the small diameter chamber, wherein said spacer and said bushing are integrally formed together and said integrally formed spacer and bushing having an annular recess, one of said seal rings being engaged in the annular recess and other of said seal rings being disposed intermediate the bottom wall of the small diameter chamber and the integrally formed spacer and bushing, and wherein said integrally formed spacer and bushing is engaged with the step of said large diameter chamber to prevent forward movement of the integrally formed spacer and bushing in the joint body during insertion of the pipe into the joint body, such that the integrally formed spacer and bushing prevents excessive deformation of the seal rings.

6. A joint according to claim 5, wherein said integrally formed spacer and bushing has a stopper wall disposed radially outwardly from the seal ring adjacent the bottom wall and said stopper wall terminating at the bottom wall of the small diameter chamber such that the integrally formed spacer and bushing and the bottom wall of the small diameter chamber surround the seal ring adjacent the bottom wall of the small diameter chamber.

* * * * *